United States Patent
Yang et al.

(10) Patent No.: US 7,302,390 B2
(45) Date of Patent: Nov. 27, 2007

(54) CONFIGURABLE DISTRIBUTED SPEECH RECOGNITION SYSTEM

(75) Inventors: Yin-Pin Yang, Taipei (TW); Po-Cheng Chen, Taipei (TW); Chien-Chieh Wang, Yun-Lin (TW)

(73) Assignee: Industrial Technology Research Institute, Hsin-Chu (TW)

( * ) Notice: Subject to any disclaimer, the term of this patent is extended or adjusted under 35 U.S.C. 154(b) by 895 days.

(21) Appl. No.: 10/338,547

(22) Filed: Jan. 8, 2003

(65) Prior Publication Data

US 2004/0044522 A1    Mar. 4, 2004

(30) Foreign Application Priority Data

Sep. 2, 2002    (TW) .............................. 91119932 A

(51) Int. Cl.
*G10L 15/00*    (2006.01)
(52) U.S. Cl. ...................... 704/246; 704/275
(58) Field of Classification Search ................ 704/246, 704/275
See application file for complete search history.

(56) References Cited

U.S. PATENT DOCUMENTS 6,801,604 B2 *   10/2004   Maes et al. .............. 379/88.17
6,941,265 B2 *   9/2005    Bi et al. ..................... 704/246
7,024,359 B2 *   4/2006    Chang et al. ............... 704/251
7,062,444 B2 *   6/2006    He et al. .................... 704/275

FOREIGN PATENT DOCUMENTS

WO        WO 01/95312 A1 *  12/2001

OTHER PUBLICATIONS

"New Aurora Activity for Standardization of a Front-End Extension for Tonal Language Recognition and Speech Reconstruction," ETSI DSR Applications and Protocols Working Group, Jun. 2001.

* cited by examiner

*Primary Examiner*—Daniel Abebe
(74) *Attorney, Agent, or Firm*—Birch, Stewart, Kolasch & Birch, LLP

(57) ABSTRACT

A configurable distributed speech recognition system comprises a configurable distributed speech recognition protocol, and a configurable distributed speech recognition server. Herein, the configurable distributed speech recognition protocol is used to establish data transmitting format, for a client speech mobile device to packet the speech data and configuration data become a message packet. The configurable distributed speech recognition system receives the message packet from the client speech mobile device, configures its own speech recognition modules and resources according to the configuration data, and then returns a result to the client speech mobile device after completing the speech recognition.

11 Claims, 3 Drawing Sheets

CONFIGURABLE DISTRIBUTED SPEECH RECOGNITION SYSTEM

BACKGROUND OF THE INVENTION

1. Field of the Invention

This invention generally relates to the field of distributed recognition system. More particularly, the presented invention relates to a configurable distributed speech recognition system.

2. Description of the Prior Art

Today, the field of speech recognition has a vision due to the advancement and development of wireless communication product. Wireless Mobile Device (WMD) with the features of portability and mobility, always has limited speed and approach of data inputting. Therefore, it is very important to have a speech recognition technique to resolve this problem. However, implementing a satisfactory speech recognizer for public user requires powerful capability of computation and memory resource, also involves various types of databases for acoustics, pronunciation, grammar and so on. Accordingly, realizing a speech recognizer on wireless mobile devices becomes impracticable.

According to the foregoing issue, there are many international speech research institutes and wireless communication product manufacturers propose an architecture called Server-Client, allocating the resource of recognition process to server side and client side. The Aurora project of ETSI (European Telecommunications Standards Institute) is the largest leading project. The Aurora project proposes the "Distributed Speech Recognition, DSR" architecture as shown in FIG. 1.

However, the purpose of distributed speech recognition architecture is to resolve the low recognizing ratio of using mobile phone to Voice Portal system. So far, using mobile phone to request Voice Portal service usually causes poor recognition rate due to speech data transmitting problem. The reason is that the speech data encoding is designed for human hearing, thus, when few speech data loss during transmitting, it may not essentially effect human hearing, but it may damage the speech recognizer seriously.

For solving the foregoing problem, the Aurora project instead of using "Speech Channel" to transmit speech-encoded data, switches to use "Error Protected Data Channel" to transmit suitable speech parameter for recognizing. Besides, further distributing recognition computing is on both side of mobile phone (client) and Voice Portal (server). The main consideration is to use the resource of server, and reduce the effect caused by speech data transmitting error.

FIG. 1 shows the components of the Aurora architecture and future noise robust front-end standards for DSR applications. As shown in FIG. 1, the Aurora DSR architecture separates recognition process to Terminal DSR Front-End and Server DSR Back-End; thus the processing is distributed between the terminal and the network. The terminal performs the feature parameter extraction, or the front-end of the speech recognition system. These feature are transmitted over a data channel to a remote "back-end" recognizer. The end result is that the transmission channel has minimal impact on the recognition system performance and channel invariability is achieved. This performance advantage is good for DSR services provided for a particular network.

However, most of wireless mobile devices cannot provide enough capability to handle the required computation on the clients, accordingly, Aurora DSR architecture is not suitable for general wireless mobile device.

Therefore, it is needed to develop distributed speech recognition architecture for general wireless mobile devices. This architecture is allowed to be configured to achieve the optimal performance based on the given speaker profiles, environment conditions, the types of mobile device and the types of recognition services.

SUMMARY OF THE INVENTION

According to the shortcomings mentioned in the background, the presented invention provides a C-DSR system to improve the foregoing drawbacks.

Accordingly, the main objective is that the presented invention is suitable for various mobile devices, not limited in mobile phone.

Another objective is that the presented invention is suitable applying various wireless networks, not limited in large-scale telecommunication network.

Another objective of the presented invention is switching among various speech recognition services easily.

Another objective is that the C-DSR system of the presented invention collects and classifies the recognition results and their associated configuration data automatically.

Another objective is to optimize the balance among recognition rate, transmission bandwidth, and loading of server side.

According to the objectives mentioned above, the presented invention provides a C-DSR system, it can be applied in all kinds of mobile phone and various speech recognition applications. C-DSR also provides an integrated platform, which is configurable to attain optimization performance according to the capabilities of computing, memory, communicating of the client.

A C-DSR system of the presented invention comprises: a configurable distributed speech recognition protocol, and a configurable distributed speech recognition server. Herein, the configurable distributed speech recognition protocol is used to establish data transmitting format, for a client mobile device to pack the speech data along with configuration data, and to become a message packet. The C-DSR system receives the message packet from the client mobile device, and adjusts speech recognition parameters according to the configuration data, and then returns a result to the client mobile device after completing the speech recognition task.

Herein, the C-DSR server comprises of a parser, a configuration controller, a configurable distributed speech recognition engine, a history log, a diagnostic tool set, and configurable dialog system. The parser is used to parse and extract the configuration data and speech data in a packet. The configuration controller is used to generate a recognition adjustment parameter according to the configuration data. The configurable distributed speech recognition engine is used to recognize the speech data passed from the parser, and is configurable to the configuration controller. The history log is used to record the result or data generated from the server. The diagnostic tool set generates a diagnostic report according to data in the history log, for tuning the C-DSR engine. The configurable dialog system according to the recognition result to analyze possible lexicon may appearing in dialog, it's for raising the recognition rate and speed of the recognition engine next time.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the invention will now be described in greater detail. Nevertheless, it should be noted that the present invention can be practiced in a wide range of other embodiments besides those explicitly described, and the scope of the present invention is expressly not limited except as specified in the accompanying claims.

A C-DSR system of the present invention comprises a configurable distributed speech recognition protocol, and a configurable distributed speech recognition server. Herein, the configurable distributed speech recognition protocol is used to establish data transmitting format, for a client speech mobile device to pack the speech data and configuration data and become a message packet. The configurable distributed speech recognition system receives the message packet from the client speech mobile device, and adjusts speech recognition parameters according to the configuration data, and then returns a result to the client speech mobile device after completing the speech recognition task.

Herein, the C-DSR server comprises of a parser, a configuration controller, a configurable distributed speech recognition engine, a history log, a diagnostic tool set, and configurable dialog system. The parser is used to parse and extract the configuration data and speech data in a packet. The configuration controller is used to generate a recognition adjustment parameter according to the configuration data. The configurable distributed speech recognition engine is used to recognize the speech data passed from the parser, and is configurable to the configuration controller. The history log is used to record the result or data generated from the server. The diagnostic tool set generates a diagnostic report according to data in the history log, for tuning the C-DSR engine. The configurable dialog system according to the recognition result to analyze possible lexicon may appearing in dialog, it's for raising the recognition rate and speed of the recognition engine next time.

Figure 1:
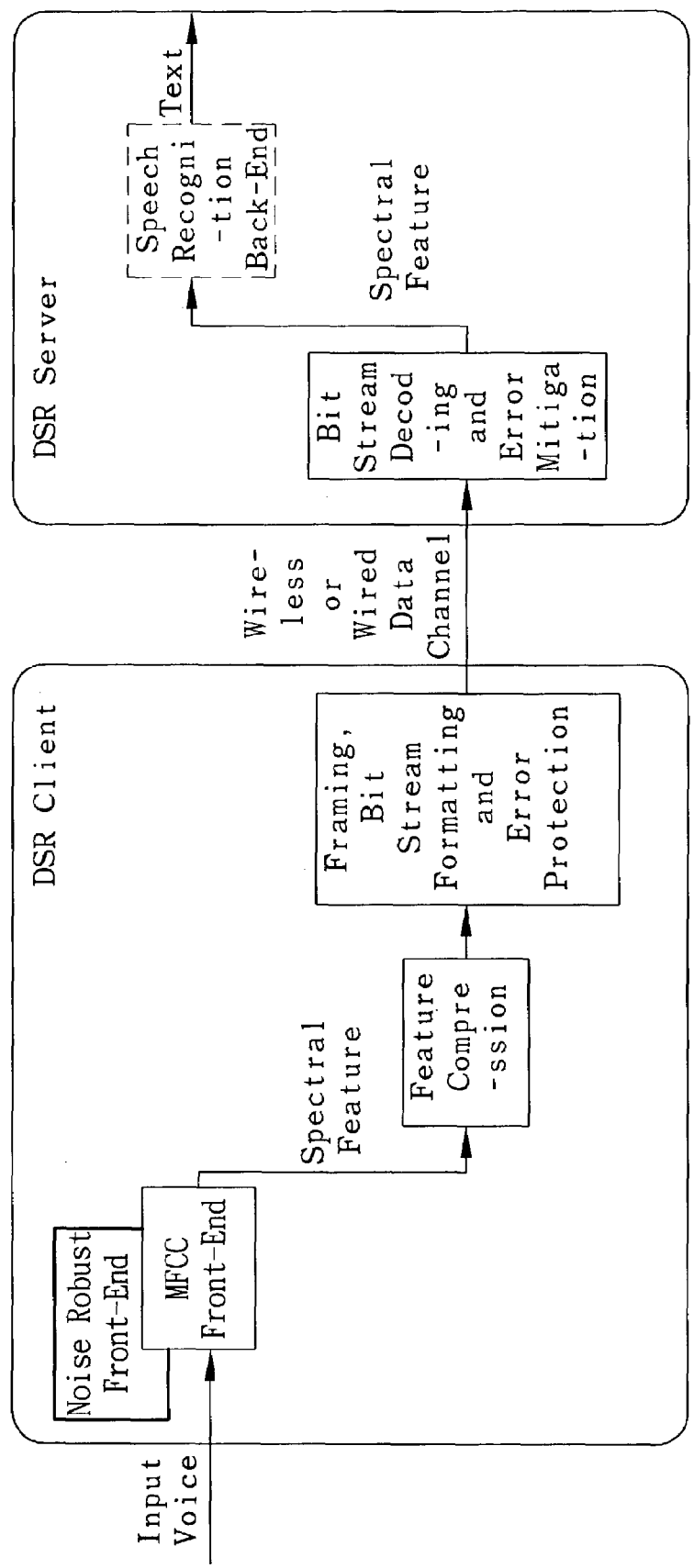
FIG. 1 shows the components of the Aurora architecture and future noise robust front-end standards for DSR applications.
Figure 2:
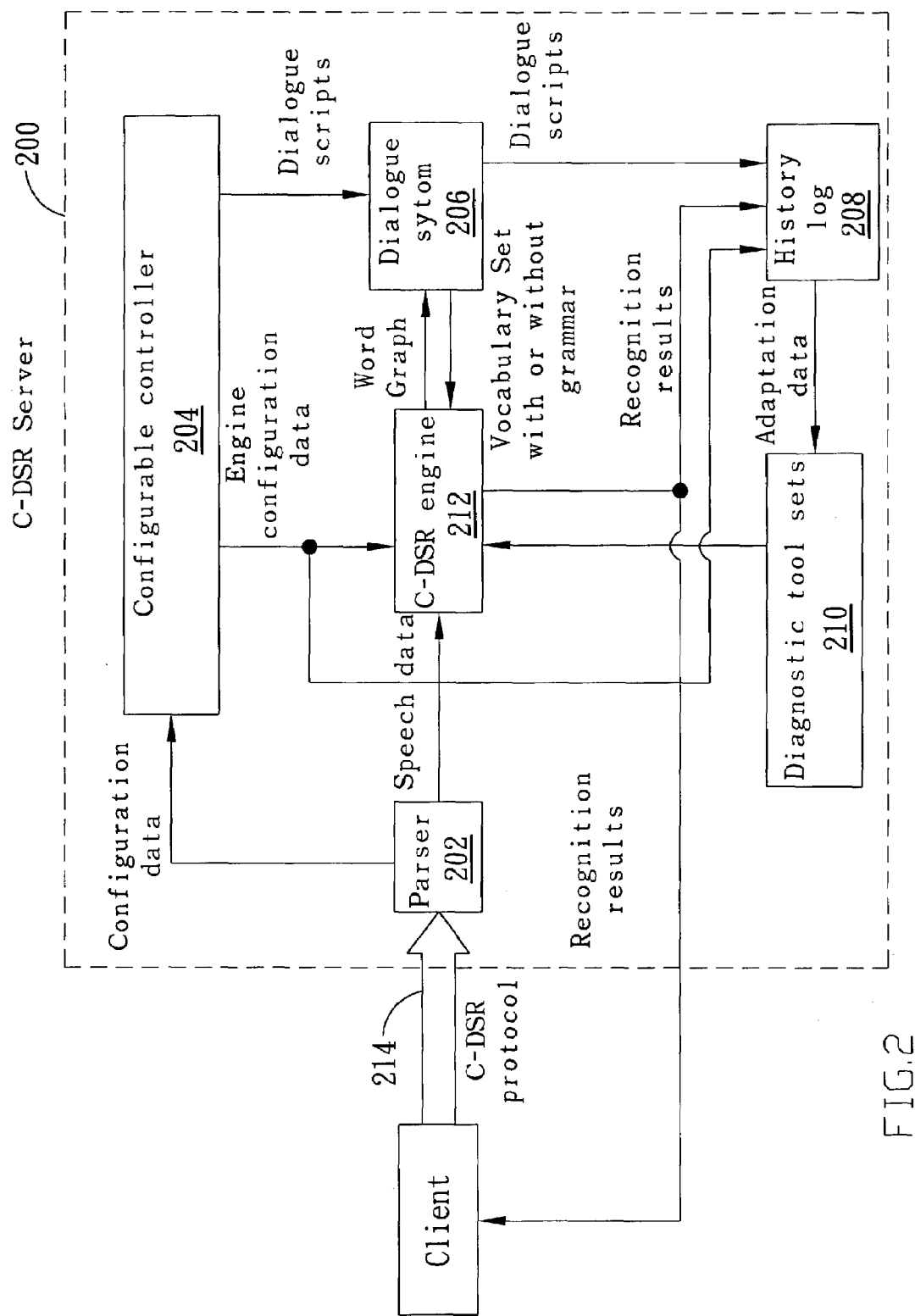
FIG. 2 shows the preferred embodiment architecture of the configurable distributed speech recognition system of the presented invention.

FIG. 2 illustrates the preferred embodiment architecture of the configurable distributed speech recognition system of the present invention, wherein the C-DSR (Configurable Distributed Speech Recognition) server 200 processes the data transmitted through C-DSR protocol 214 (Configurable Distributed Speech Recognition protocol).

The client side data will be transmitted to the C-DSR server as a message packet, which fit with the specification of C-DSR protocol 214. The message packet comprises configuration data and speech data, wherein the configuration data is defined as: Non-speech data that may be required to facilitate and enhance the speech recognition engine, such as Speaker Profile, Acoustic Environment, Channel Effects, Device Specification, and Service Type, and other information which can benefit to the engine. However, due to some circumstances, sometimes the client device does not have enough information to fill all the fields of the configuration data, in this case, the C-DSR protocol allows that the client only fill in a portion of the fields of the configuration data and C-DSR server will handle the rest. The speech data in the protocol can be un-processed speech data or the processed/formatted feature vectors for the C-DSR sever 200 to proceed the speech recognition process.

The C-DSR server 200 at least comprises: a parser 202, a configuration controller 204, an configurable dialog system 206, a history log 208, a diagnostic tool sets 210, and a C-DSR engine 212, wherein the parser 202 parses the message packet, which is transmitted to the C-DSR server 200 via the C-DSR protocol 214, subsequently a configuration data is extracted from the message packet then sent to the configuration controller 204. When the configuration controller 204 takes the configuration data if the information fields included in the configuration data are not filled completely, the configuration controller 204 will modify/append those uncompleted fields and produce a complete "engine" configuration data, then send it to C-DSR engine 212. Although, client can fully control the C-DSR engine 212, the client doesn't need to one by one set/fill all fields of the configuration data completely under some situations. For example, client may just issue a command "As_previous" to server, and the server will bring up the previous configuration used by this client and copy all of the fields to current configuration. The configuration controller 204 has an additional capability, filling the fields refer to the reference resources, which are the status of present system and communication, to reach the purpose of making optimization balance between the transmission speed and recognition rate.

Subsequently, sending the speech data to the C-DSR engine 212 to proceed speech recognition, the configurable dialog system 206 is a of dialog mechanism, and it, also can be operated by the configuration controller 204, so that it's called "Configurable Dialog System" 206 (CDS). The configurable dialog system 206 is in charge of the dialog progress and dialog status recording. For example, when voice browsing application (which is a service type) is used in C-DSR platform. The dialog system industry standard, Voice XML and SALT can be the options in the configurable dialog system 206, in other words, the Voice XML parser and SALT parser can both be included in configurable dialog system 206, but not limited in both of them. The configurable dialog system 206 has its own dialog script to conveniently design some simple dialog flow. The data inputted to the configurable dialog system 206 are dialog script and the result of the C-DSR engine 212, which is a word or a word graph. Subsequently, after processing, the configurable dialog system 206 outputs a vocabulary set with or without grammar. The word graph can be the needed reference data in next time recognition of the C-DSR engine 212. Noted that, when a "voice-command" based service is provided, this block (CDS) is by-passed.

The history log 208 is used to collect/record/classify the speech data or feature vectors, its corresponding recognition results, configuration parameter, dialog status. The outputting of the C-DSR 212 and configurable dialog system 206, the intermediate data of the modules, and diagnostic data, all of them will be stored in the history log 208 for analysis, accordingly the history log 208 can be a database. The diagnostic tool set 210 performs statistics and diagnosis depends on the history log data, for tuning the C-DSR engine 212.

The diagnostics tool sets 210 is in charge of using the history log data to generate diagnostic reports, which are the tuning parameter used to adjust the C-DSR engine 212, and the purpose of it is to keep the C-DSR engine 212 in high efficiency. Herein, the high efficiency means that when engine raises the recognition ratio and also take care of the memory and computation cost requirement in the same time. One of the C-DSR engine features is to make an optimization balance among memory, CPU power, transmission bandwidth, and recognition rate. This block is optimal to the whole C-DSR platform.

In the present invention, the C-DSR engine 212 is a generalized recognition engine with adaptation feature, it can adapt to speaker speech and device parameter according to user's instructions. The adaptation feature is based on adaptation data, thus each engine configuration data and its corresponding outputting result of the C-DSR engine 212, will be automatically classified and coordinated then stored in a database (the history log 208). The C-DSR engine 212 returns the recognition result to the client via the C-DSR protocol 214, meanwhile, copy it for the history log 208. Noted here, this block is by-passed when C-DSR engine does not support any adaptation mechanism.

C-DSR engine 212 accepted engine configuration data from the configuration controller 204 and configure itself to take corresponding action to each fields: Take the following three fields for examples, (1) Various speaker profiles, such as name/gender/age/accents, the C-DSR engine 212 may use different sets of adjustment data to adapt suitable acoustic models; these data are parts of diagnostic reports and prepared by diagnostic tool sets 210. (2) Various acoustic environment or channel effects, such as office/home/street/car, or far-field/near/types of microphones, these data are also prepared by diagnostic tool sets 210. Or (3) various service types, such as continuous/ command-based modes, the C-DSR engine 212 may employ different pattern-match algorithm to perform recognition tasks.

Figure 3:
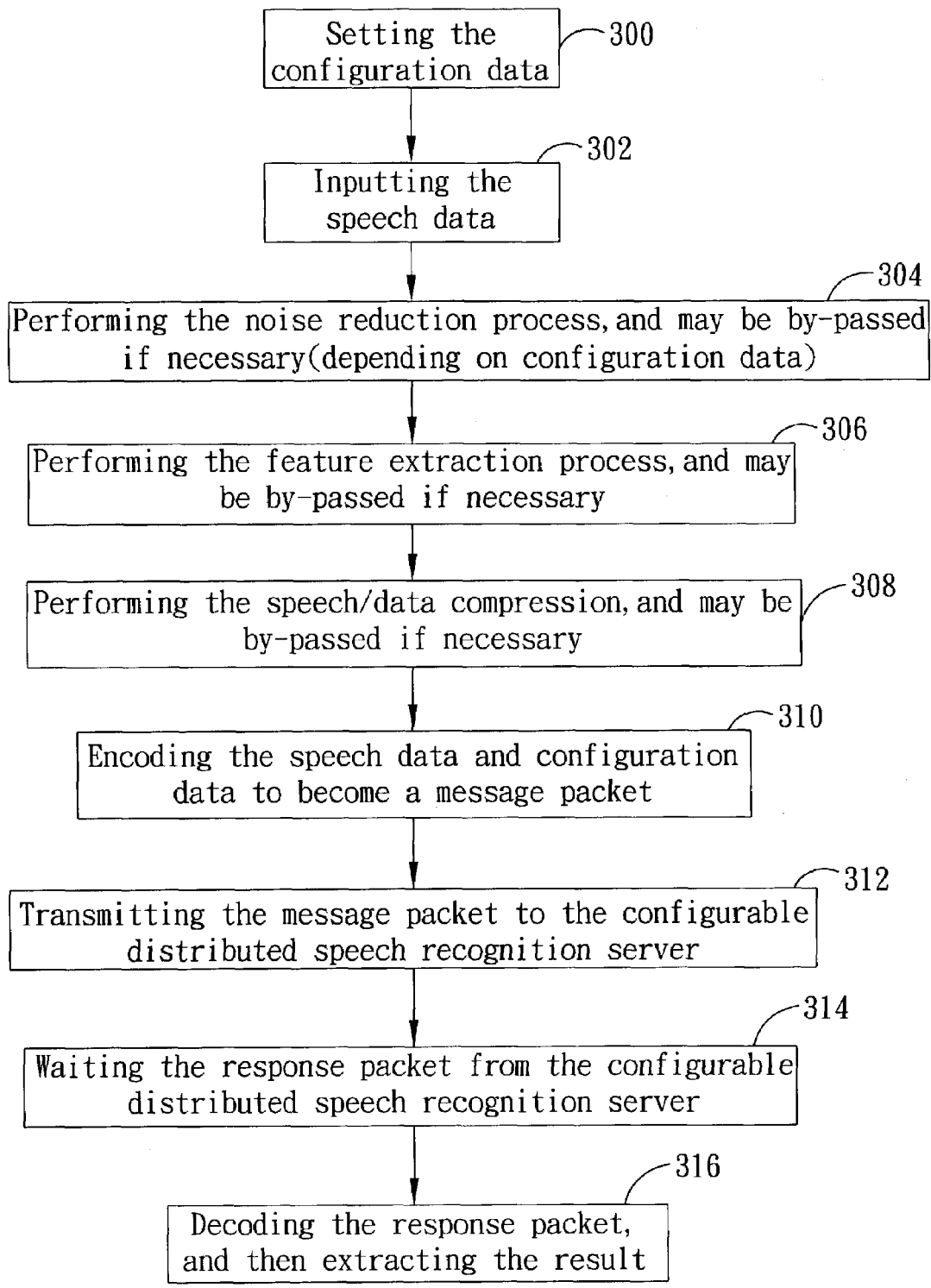
FIG. 3 shows the steps of processing data in client side.

FIG. 3 shows the steps of processing data in client side. Firstly, setting the configuration data 300, wherein the configuration data is composed by using configurable fields such as speaker profiles, environment parameters and types of client devices. Subsequently, inputting the speech data 302, then performing the processes of the noise reduction 304 (if any), feature extraction 306, and speech/data compression 308, herein the step 304, step 306, and step 308 can be removed depending on how the configuration data is set.

Subsequently, packing the speech data and configuration data to become a message packet 310, next step is transmitting it to the C-DSR server 312 then waiting the response 314. The last step 316 is that unpacking the response packet, and extracting the result.

According to the objects mentioned above, the present invention provides a C-DSR system, it can be applied in all kinds of mobile phone and various applications, besides provides an integrated platform. The present invention can also be configured to fit with various client devices to attain optimization recognition according to the capability of computing, memory, communicating of the client.

Although specific embodiments have been illustrated and described, it will be obvious to those skilled in the art that various modifications may be made without departing from what is intended to be limited solely by the appended claims.

What is claimed is:

1. A C-DSR system, comprising:
   a configurable distributed speech recognition protocol, for specifying the speech and configuration data transmission format of a client device, to become a message packet; and
   a configurable distributed speech recognition server, for receiving said message packet from said client device, said configurable distributed speech recognition server performs speech recognition parameter adjustment according to said configuration data, and returns a speech recognition result to said client device,
   wherein said configurable distributed speech recognition server comprises a history log for recoding history data generated by said configurable distributed speech recognition server.

2. The C-DSR system according to claim 1, wherein said client device is a mobile device.

3. The C-DSR system according to claim 1, wherein said configurable distributed speech recognition server further comprises:
   a parser, for parsing said message packet then to extract said configuration data and said speech data;
   a configuration controller, for processing said configuration data, and according to said configuration data to generate a recognition adjustment parameter, said recognition adjustment parameter is used to configure the resources of said configurable distributed speech recognition server based on the computing, memory, communication, and bandwidth allocation of said client device;
   a C-DSR engine, for recognizing said speech data sent from said parser, and said C-DSR engine is configured by said configuration controller; and
   a diagnostic tool set, for tuning said C-DSR engine depending on said history data.

4. The C-DSR system according to claim 1, wherein said C-DSR server further includes a configurable dialog system, said configurable dialog system analysis and then generates a word graph that possible appearing in a dialog, according to the recognition result of said C-DSR engine, for raising recognition rate and recognition speed in next recognizing process.

5. The C-DSR system according to claim 4, wherein said history log is used to record the result generated by said configuration controller, said C-DSR engine, and said configurable dialog system.

6. The C-DSR system according to claim 1, wherein said configuration data is selected from the group consisting of speaker profile, acoustic environment, channel effects, client device specification, and service type.

7. A C-DSR server, comprising:
   a parser, for receiving and parsing a message packet, then extracting a configuration data and a speech data included in said message packet;
   a configuration controller, for processing said configuration data, and according to said configuration data to generate a recognition adjustment parameter, said recognition adjustment parameter is used to configure the resources of said C-DSR server based on the computation, memory, communication, and bandwidth allocation of said client device;
   a C-DSR engine, for recognizing said speech data sent by said parser, and said C-DSR engine is configured by said configuration controller; and
   a history log to record history data generated by said C-DSR server.

8. The C-DSR server according to claim 7, further comprising a diagnostic tool set to tune said C-DSR engine depending on said history data.

9. The C-DSR server according to claim 7, further comprising a configurable dialog system to analysis and then generate a word graph that possible appearing in a dialog, according to the recognition result of said C-DSR engine, for raising recognition rate and recognition speed in next recognizing process.

10. The C-DSR server according to claim 7, wherein said message packet is sent by a mobile device.

11. The C-DSR server according to claim 10, wherein said configuration data is selected from the group consisting of speaker profile, acoustic environment, channel effects, client device specification, and service type.

\* \* \* \* \*